> 3,314,855
> ANTIDEPRESSANT COMPOSITIONS AND
> METHODS OF USING SAME
> Max Chessin, Fair Lawn, N.J., assignor to Warner-Lambert Pharmaceutical Company, Morris Plains, N.J., a corporation of Delaware
> No Drawing. Filed Oct. 10, 1958, Ser. No. 766,407
> 10 Claims. (Cl. 167—65)

This application is a continuation-in-part of my co-pending application S. No. 680,919 filed on Aug. 29, 1957, now abandoned.

This invention relates to certain novel hydrazine compounds, and relates more particularly to therapeutic compositions of the bases and the non-toxic acid salts of the bases of the formula:

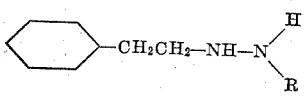

wherein R is selected from the group consisting of hydrogen and lower alkyl.

It has been found that a highly desirable physiological response including central nervous system stimulation, as well as a degree of stimulation effective in offsetting mental depression may be produced by the oral or parenteral administration of certain novel compositions comprising the dosage forms of the above substituted hydrazine compounds and the non-toxic acid addition salts of said compounds in combination with a pharmaceutical carrier. Preferably the dosage unit administered, whether in liquid or solid form, will contain from 5 to 200 milligrams of the hydrazine compound per unit, although the dosage units more commonly employed will contain from 10 to 25 milligrams each.

The physiological response observed is a marked lifting of mood and the activity of said compounds is best described as being a psychic energizer or antidepressant. It has been noted that the compounds described, including the parent compound $\beta$-phenylethylhydrazine, are potent monamine oxidase inhibitors and this physiological action appears to be linked to their pronounced activity as stimulants useful in offsetting mental depression.

The parent compound $\beta$-phenylethyl hydrazine is described in Coll. Czechoslovak Chem. Comm., 4, 271 (1932), and the free base is prepared by the catalytic reduction of $\beta$-phenylacetaldehyde hydrazone.

In formulating the novel compositions comprising the dosage forms of said hydrazine compounds, the acid addition salts of the hydrazine bases are preferably employed since they are obtainable in generally crystalline, solid form which makes them quite convenient to handle in preparing the desired formulations. As examples of the salts of said hydrazine bases which may be conveniently employed in the preparation of said dosage forms there may be mentioned the hydrochloride, sulfate, phosphate, acetate, propionate, citrate, tartrate, succinate, maleate, sulfamate, sulfonilate and salicylate.

The compositions of this invention comprise not only the novel hydrazine compounds described but also the suitable dosage units of said compounds in the various dosage forms commonly employed such as tablets, coated or uncoated, and which may be suitably formulated for either immediate or sustained release, capsules, syrups, elixirs, parenteral solutions, suppositories, and the like. These dosage forms may contain, per unit, one or more multiples of the desired milligram quantity constituting each dosage unit in combination with the pharmaceutical diluent or diluents required for preparing and dosage unit.

In formulating $\beta$-phenylethyl hydrazine, for example, into the desired dosage form, either the hydrochloride, or more preferably, the sulfate may be employed. The sulfate appears to exhibit a somewhat greater stability in the formulations. The hydrochloride is soluble in water to the extent of 20% and melts at 160–162° C. A 1% aqueous solution has a pH of 3.3. The sulfate of $\beta$-phenylethyl hydrazine is soluble in water to the extent of about 15% and melts at 167–168° C. A 1% aqueous solution has a pH of 1.25.

In order further to illustrate this invention but without being limited thereto, the following examples are given:

EXAMPLE I

Solution for injection:

| | |
|---|---|
| $\beta$-Phenylethylhydrazine hydrochloride _____g__ | 1 |
| Water USP, q.s. to 100 ml. | |

The active ingredient is dissolved in water, filtered and filled into 1 ml. ampules. The ampules are sterilized at 115° C. for 15 minutes. Each ml. contains 10 mg. active ingredient.

EXAMPLE II

Tablets:

| | Grams |
|---|---|
| $\beta$-Phenylethylhydrazine hydrochloride _____ | 25 |
| Methyl cellulose, 400 cps. _____ | 4 |
| Lactose _____ | 9 |
| Magnesium stearate _____ | 0.4 |
| Starch _____ | 1.6 |

The powders, except magnesium stearate, are granulated with water, passed through a No. 16 mesh screen and dried at 50° C. Magnesium stearate is mixed in and 40 mg. tablets are pressed. Each tablet contains 25 mg. active ingredient.

EXAMPLE III

Tablets:

| | Grams |
|---|---|
| $\beta$-Phenylethylhydrazine hydrochloride _____ | 10 |
| Methyl cellulose, 400 cps. _____ | 1.6 |
| Lactose _____ | 3.6 |
| Magnesium stearate _____ | 0.2 |
| Starch _____ | 4.6 |

200 mg. tablets are prepared as in Example II. Each tablet contains 100 mg. active ingredient.

EXAMPLE IV

Suppositories:

| | Grams |
|---|---|
| $\beta$-Phenylethylhydrazine hydrochloride _____ | 25 |
| Cocoa butter _____ | 2300 |

The active ingredient is stirred into molten cocoa butter and mixed thoroughly. The mixture is poured into chilled suppository molds and allowed to solidify. Each suppository (2.3 g.) contains 25 mg. active ingredient.

EXAMPLE V

Elixir:

| | | |
|---|---|---|
| $\beta$-Phenylethylhydrazine hydrochloride ____g__ | | 10 |
| Alcohol USP _____ml__ | | 100 |
| Invert sugar _____ml__ | | 750 |
| Benzoic acid _____g__ | | 0.3 |
| Flavors _____g__ | | 0.2 |
| Water, q.s. to 1000 ml. | | |

The invert sugar is diluted with 100 ml. water and the benzoic acid and active ingredient added. Alcohol containing the flavor is added and water added to volume. The solution is filtered and bottled. Each 5 ml. contains 50 mg. active ingredient.

EXAMPLE VI

Tablets:

| | Grams |
|---|---|
| $\beta$-Phenylethylhydrazine sulfate _____ | 25 |
| Methyl cellulose, 400 cps. _____ | 4 |
| Lactose _____ | 9 |
| Magnesium stearate _____ | 0.4 |
| Starch _____ | 1.6 |

The tablets are prepared as in Example II. Each tablet contains 25 mg. of active ingredient.

EXAMPLE VII

Suppositories:
| | Grams |
|---|---|
| β-Phenylethylhydrazine maleate | 25 |
| Cocoa butter | 2300 |

The suppositories are prepared as in Example IV. Each suppository (2.3 g.) contains 25 mg. active ingredient.

EXAMPLE VIII

Elixir:
| | | |
|---|---|---|
| β-Phenylethylhydrazine tartrate | g | 10 |
| Alcohol USP | ml | 100 |
| Invert sugar | ml | 750 |
| Benzoic acid | g | 0.3 |
| Flavors | g | 0.2 |
| Water, q.s. to 1000 ml. | | |

The elixir is prepared as in Example V. Each 5 ml. contains 50 mg. active ingredient.

EXAMPLE IX 1 part by weight of phenethylhydrazine and 40 parts by weight of acetone, slightly acidified with acetic acid, are refluxed for about 4 hours and the acetone remaining is then stripped off by distillation. The residue is distilled at a temperature of 86–87° C. at 0.8 mm. pressure to yield the desired N-(β-phenylethyl)-N′-isopropylhydrazine having a refractive index $n_D^{24}$ of 1.5299.

15 parts by weight of the latter compound are dissolved in 240 parts by weight of absolute ethanol and shaken with hydrogen at 30 lbs. per square inch pressure at room temperature in the presence of a platinum hydrogenation catalyst until the theoretical amount of hydrogen has been taken up. The catalyst is filtered off, the solvent is removed by distillation and the oily residue fractionally distilled, the fraction boiling at 60° C. at 0.15 mm. mercury pressure being separated. The refractive index $n_D^{25}$ of the latter is 1.5115. The 1-isopropyl-2-phenethylhydrazine thus formed is converted to the hydrochloride by dissolving 9 parts by weight of the compound in about 160 parts by weight of absolute ether and passing dry hydrogen chloride gas through the mixture until it is strongly acidic. The solid material formed is the hydrochloride salt. The latter is removed by filtration and purified by recrystallization from ethyl acetate. The hydrochloride salt has a melting point of 120–121° C.

I claim:
1. A therapeutic composition in dosage unit form comprising a pharmaceutical carrier and from 5 to 200 milligrams per unit of a substituted hydrazine of the group consisting of the non-toxic acid salts of the base and the base of the formula

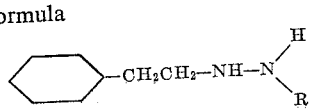

wherein R is selected from the group consisting of hydrogen and lower alkyl.

2. A therapeutic composition in accordance with claim 1 in which a solid pharmaceutical carrier is employed.
3. A therapeutic composition in accordance with claim 1 in which a liquid pharmaceutical carrier is employed.
4. A therapeutic composition in dosage unit form comprising a pharmaceutical carrier and from 5 to 200 mg. per unit of an non-toxic salt of β-phenylethyl hydrazine.
5. A therapeutic composition in dosage unit form comprising from 5 to 200 mg. per unit of the hydrochloride of β-phenylethyl hydrazine.
6. A therapeutic composition in dosage unit form comprising from 5 to 200 mg. per unit of the sulfate of β-phenylethyl hydrazine.
7. A therapeutic composition in dosage unit form comprising a pharmaceutical carrier and from 5 to 200 mg. per unit of 1-isopropyl-2-phenethylhydrazine.
8. A therapeutic composition in dosage unit form comprising a pharmaceutical carrier and from 5 to 200 mg. per unit of 1-isopropyl-2-phenethylhydrazine hydrochloride.
9. The method of treating the human body to effect a lifting of the mood comprising administering from about 5 to 200 milligram doses of a composition of claim 1.
10. The method of treating the human body to effect a lifting of the mood comprising administering a therapeutic composition in dosage unit form comprising a pharmaceutical carrier and an amount effective to offset mental depression of a substituted hydrazine of the group consisting of the non-toxic acid salts of the base and the base of the formula

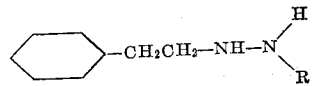

wherein R is selected from the group consisting of hydrogen and lower alkyl.

References Cited by the Examiner

Andrieth et al., Chem. of Hydrazine, 1951, p. 211.
Beilstein, vol. 15, 1st suppl. (1934), p. 164.
Beilstein, vol. 15, 2nd suppl. (1951), p. 248.
Votocek et al., Chem. Abstract, vol. 26 (1932) p. 5294.

SAM ROSEN, *Primary Examiner.*

IRVING MARCUS, DONALD LEVY, MORRIS O. WOLK, WILLIAM B. KNIGHT, *Examiners.*

C. A. MUSERLIAN, J. S. SAXE, *Assistant Examiners.*